United States Patent [19]

Barten et al.

[11] Patent Number: 5,587,566

[45] Date of Patent: Dec. 24, 1996

[54] METHOD FOR ADJUSTING AN ELEVATOR DOOR

[75] Inventors: Michael Barten; Mustapha Toutaoui, both of Berlin, Germany

[73] Assignee: Otis Elevator Company, Farmington, Conn.

[21] Appl. No.: 236,595

[22] Filed: Apr. 29, 1994

[51] Int. Cl.[6] .............................. B66B 13/00; B66B 3/00
[52] U.S. Cl. ........................ 187/316; 187/247; 187/393
[58] Field of Search .................................. 187/247, 316, 187/390, 393

[56] References Cited

U.S. PATENT DOCUMENTS

| | | |
|---|---|---|
| 4,305,481 | 12/1981 | Hmelovsky et al. . |
| 5,042,621 | 8/1991 | Ovaska et al. ........................ 187/133 |
| 5,157,228 | 10/1992 | Ackermann et al. .................... 187/112 |
| 5,257,176 | 10/1993 | Uetani ..................................... 364/148 |
| 5,290,975 | 3/1994 | Mizuno et al. ......................... 187/103 |

FOREIGN PATENT DOCUMENTS

| | | |
|---|---|---|
| 3515945 | 11/1986 | Germany . |
| 9307326 | 7/1993 | Germany . |
| 2201810 | 9/1988 | United Kingdom . |
| WOA93/16949 | 9/1993 | WIPO . |

*Primary Examiner*—Robert Nappi

[57] ABSTRACT

A method for adjusting an elevator door includes the steps of selecting an elevator door adjustment task from a task list which is provided by an elevator door controller. The elevator door controller is adapted to control the phase, voltage and torque of an elevator door motor. The controller is provided with an elevator door adjustment program which is adapted to provide a set of program prompts to a service person who inputs elevator door parameters in response to the set of program prompts. The parameters are then stored in a memory accessible to said elevator door controller the elevator door in thereafter controlled in accordance with the inputted parameters.

16 Claims, 7 Drawing Sheets

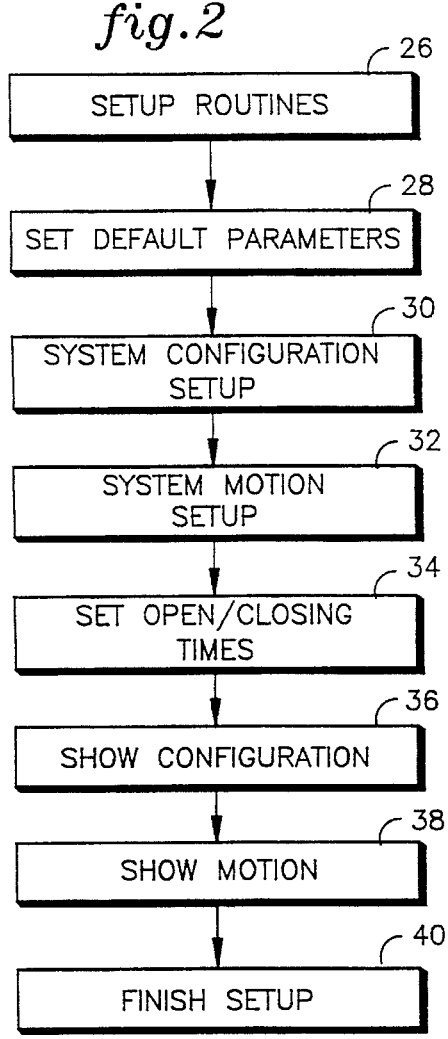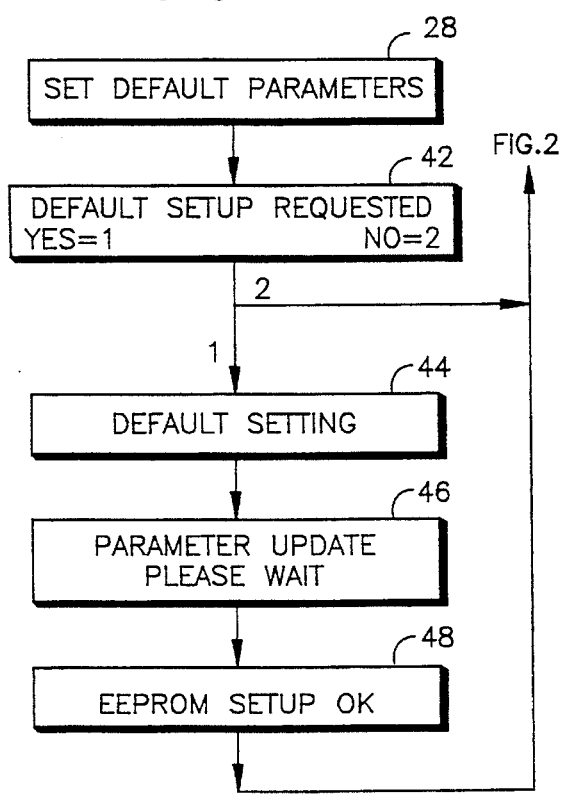

5,587,566

METHOD FOR ADJUSTING AN ELEVATOR DOOR

BACKGROUND OF THE INVENTION

1. Field of the Invention

The present invention generally relates to a method for adjusting an elevator door and, in particular, relates to one such method including the step of selecting an elevator door adjustment task from a task list.

2. Description of the Prior Art

The adjustment of an elevator door is critical not only to ensure the proper operation of the elevator but also to ensure the safety of the passengers using the elevator. Further, some of the parameters of the operation of an elevator door must meet certain safety code requirements. For example, the door closing speed and force must be less than certain levels to ensure the safety of passengers who happen to be in the path of the door when the door is closing.

Conventionally, the adjustment of an elevator door often required numerous mechanical adjustments. For example, for some of the adjustment operations the door drive motor would have to be disconnected. In addition, the adjustment of the elevator door would be dependant upon numerous other factors, such as the door weight, the number of doors, as well as the door width. All of these factors, as well as such parameters as motor size, motor type, linkage type and the like, required manual adjustment.

As a result, the adjustment of an elevator door, not only at the time of installation but during servicing, required a highly trained specialist and was quite time consuming and therefore quite expensive.

Consequently, a method for adjusting an elevator door that overcomes these drawbacks is highly desirable.

SUMMARY OF THE INVENTION

Accordingly, it is one object of the present invention to provide a method for adjusting an elevator door that is adapted for different door mechanics and which can be used without the need for substantial mechanical adjustments.

This object is accomplished, at least in part, by a method for adjusting an elevator door that includes the step of selecting an elevator door adjustment task from an elevator door adjustment task list.

In one aspect of the invention a service person establishes communication with an elevator system controller that contains a software program that provides prompts to the service person to enable the inputting of system parameters into the system controller by the service person. The system controller then uses the inputted parameters to control the phase, frequency and voltage of an elevator door motor. In this manner the direction, the speed and the torque, respectively, of the motor, and hence, the door movement, are controlled.

Other objects and advantages of the present invention will become apparent to those skilled in the art from the following detailed description read in conjunction with the appended claims and the drawing attached hereto.

BRIEF DESCRIPTION OF THE DRAWINGS

The drawings, not drawn to scale, include:

FIG. 2 which is a flow diagram of an elevator door adjustment task selection list useful in conjunction with the principles of the present invention;

FIG. 3 which is a flow diagram of an elevator door adjustment default routine;

DETAILED DESCRIPTION OF THE PREFERRED EMBODIMENT

Figure 1:
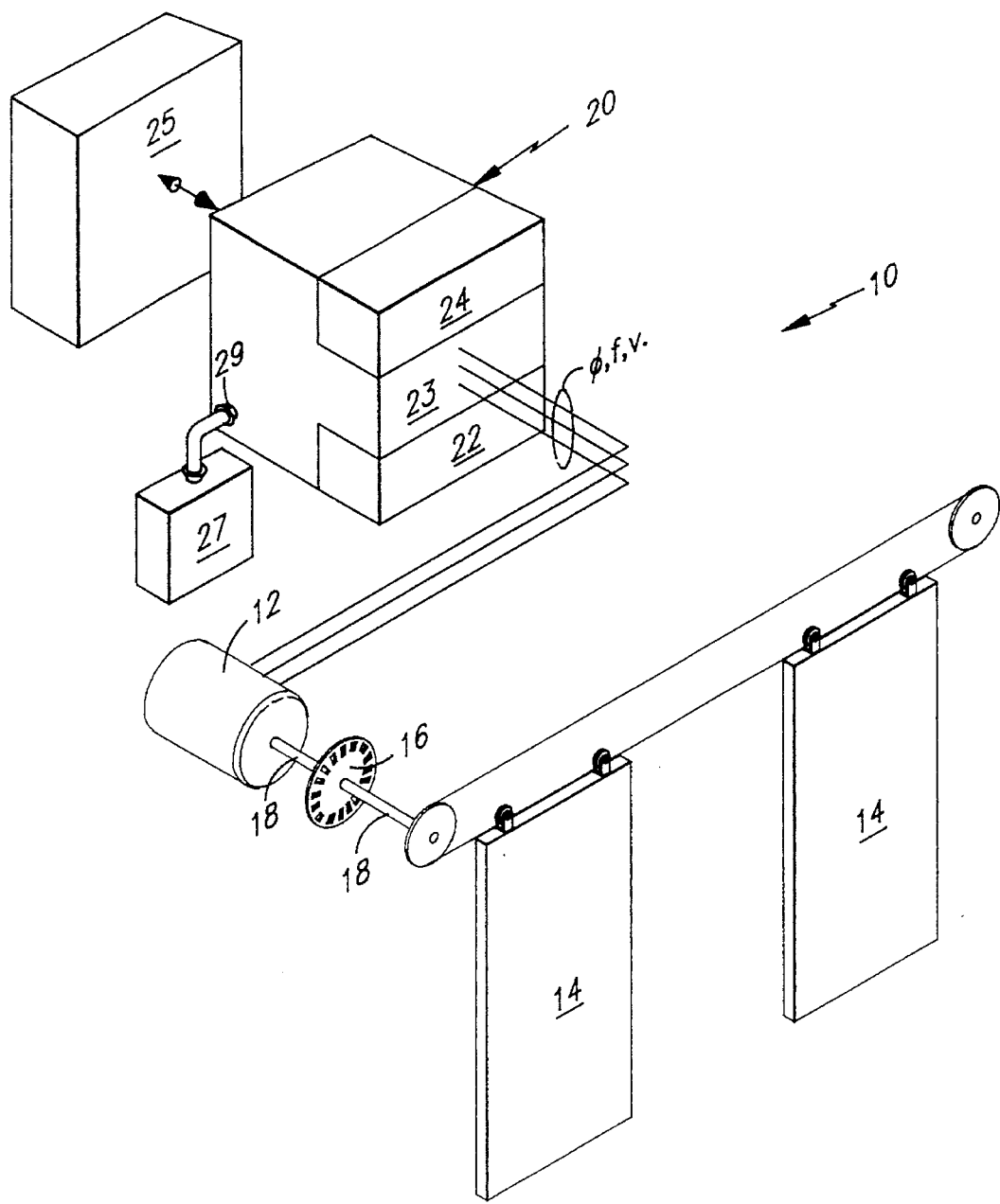
FIG. 1 which is a block diagram of an elevator door system to which the present method is particularly useful.

An elevator door system, generally indicated at 10 in FIG. 1 includes a motor 12 adapted to open and close elevator doors 14. In one particular embodiment, the motor 12 is a three phase AC motor having an encoder 16 affixed to the drive shaft 18 thereof. Such an arrangement is more fully describe and discussed in U.S. patent application Ser. No. 08/227,135, filed on Apr. 14, 1994, entitled Apparatus and Method for Controlling Elevator Doors and assigned to the assignee hereof. The subject matter set forth on pages 4 through 11 of that patent application is hereby incorporated herein by reference.

As shown in FIG. 1 the system 10 further includes a system controller 20 adapted to control the phase, voltage and frequency of the elevator door drive motor 12. As such, the system controller 20 controls the direction, the torque and the speed, respectively, of the elevator door drive motor 12. By the control of these parameters, which are preprogrammed into the memory 22 accessible to a preprogrammed microprocessor 23 of the system controller 20, the opening and closing of the elevator door 14 is electronically regulated. Preferably, the memory 22 includes at least one electronically erasable programmable read-only-memory section 24 (EEPROM) that can be used for updating the system information and parameters. Preferably, the system 10 further includes a profile generator 25 which is a software task that provides several velocity profiles such as, for example, opening and closing profiles for high traffic operation, opening and closing profiles for low traffic operation, a plurality of reversal profiles, nudging profiles, and initialization profiles. In one embodiment, the profile generator 25 includes look up tables having the various profiles and parameters stored therein. The use of look up tables minimizes the execution time of the microprocessor 23.

At the time of installation or at any other subsequent time, for example, at routine service visits, or when the elevator is in need of servicing, the adjustment of the elevator door 14 must be addressed. In accordance with the present inventive method, the service person merely has to connect a portable service tool 27 into a receptacle 29 that interfaces with the system controller 20. The system controller 20 includes, resident in the memory 22 thereof, a program for adjusting any elevator door 14.

Hence, upon establishing communication with the system controller 20 the service person, as shown at block 26 in FIG. 2, initiates the elevator door setup routine. It will be understood that, in the preferred embodiment, the service tool 27 used by the service person is a "dumb" terminal and does not have any software programs residing therein other than those necessary to communicate with the system controller 20. That is, through the service tool 27 the service person responds to the input requests of the service controller 20.

As shown in FIG. 2, upon establishing communication with the service controller 20, the setup routine 26 is initiated. The service person is then presented with an elevator door adjustment task list which can be scrolled through by use of an enter key on the service tool 27. As shown, the service person can select a particular task from the elevator door adjustment task list, including the tasks of set default parameters (block 28), system configuration setup (block 30), system motion setup (block 32), set opening and closing times (block 34), show configuration (block 36), show motion (block 38), and finish setup (block 40). Each of these task selections are available to the service person and can be selected, for example, by hitting the enter key or passed over, for example, by hitting the scroll key of the service tool 27. In the case of adjusting the elevator door upon installation, for example, each of the tasks would preferably be selected in order. Subsequent to the installation, such as, for example, for a routine service visit, only selected ones of the tasks available form the elevator door adjustment task list may be selected as needed. The following description is for a full elevator door installation setup. Hence, upon establishing communication with the system controller 20 the service person will select the task of setting the default parameters, block 28, for the elevator door system 10.

As shown in FIG. 3, upon selecting the task of setting the default parameters, block 28, the service person is first prompted, at block 42, to respond to the query of whether or not the default setup is requested. It will be understood that the default parameters are system specific and although they can be different for different elevator door systems, they will be constant for each such system. This prompt is responded to, for example, by use of a numerical keypad on the service tool. As shown in FIG. 3, if the number 1 is entered then the service person is prompted to enter the default parameters whereas if the number 2 is entered then the service person is returned to the elevator door adjustment task list shown in FIG. 2. A positive response then allows the service person to enter the default parameters at block 44. Such default parameters will include such factors as, the system gain, the time constant for the controller, and such other information as needed to allow the elevator door system to initialize itself, for example, in the event of a power down situation.

When the entry of the parameters is completed, the program, at block 46, updates the listing of parameters stored in the memory 22 of the system controller 20. Thereafter, the service person is prompted to check the current setup, at block 48, as stored in the programmable EEPROM 24. If the setup is correct the service person is returned to the main menu of elevator door adjustment tasks. If the setup is incorrect, the service person is returned to the default setting entry prompt at block 42 whereupon the process is repeated.

Figure 4:
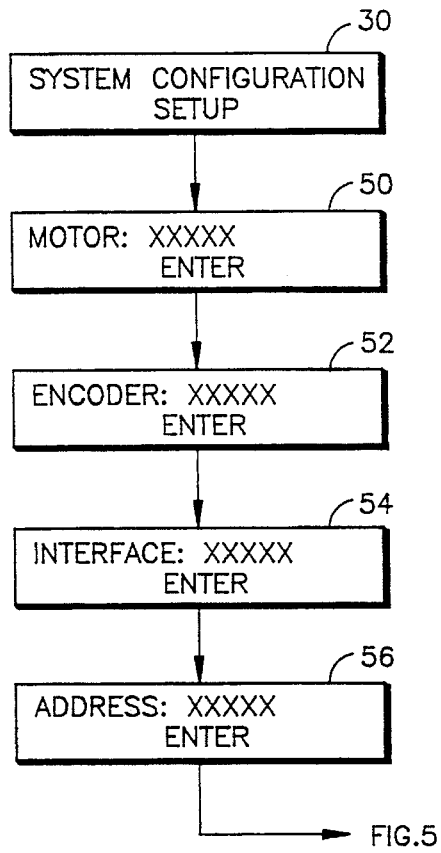
FIG. 4 which is a flow diagram of a system configuration adjustment task.

The service person next selects the system configuration setup task, block 30, as shown in FIG. 4. As shown therein, the service person is prompted to enter the motor type at block 50, the encoder type at block 52, the type of interface, i.e., serial or discrete, at block 54 and, in the case of a serial interface, the address for the serial interface, at block 56. These parameters inform the system controller 20 about the assembled elevator components. Upon completion of the system configuration setup routine the service person is automatically transferred to the show configuration setup routine at block 36 as shown in FIG. 5.

Figure 5:
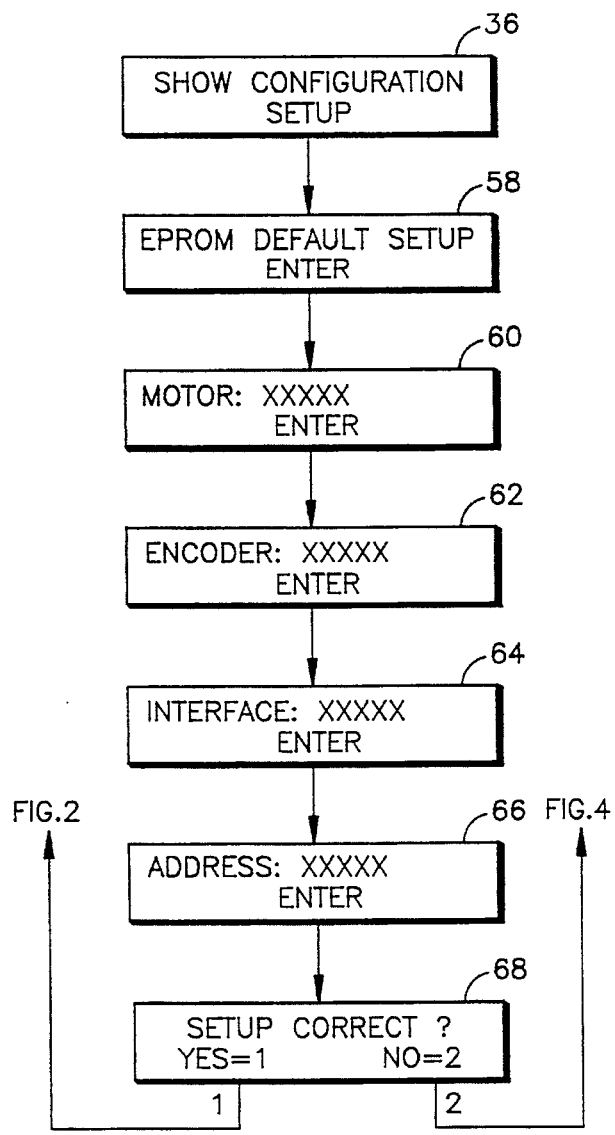
FIG. 5 which is a flow diagram of a system configuration subroutine useful in conjunction with the principles of the present invention.

As shown in FIG. 5, the selected system configuration is then displayed by use the scroll key. The service person is prompted at block 58 to select the default setup, and is then prompted to confirm the entries made with respect to the motor type, block 60, the encoder type, block 62, the interface, block 64 and the address at block 66. The service person is then prompted to confirm that the system configuration setup is correct at block 68. In the event that the system configuration setup is correct, the program returns the service person to the elevator door adjustment task list shown in FIG. 2. Otherwise, the service person is returned to the system configuration setup routine shown in FIG. 4.

Figure 6:
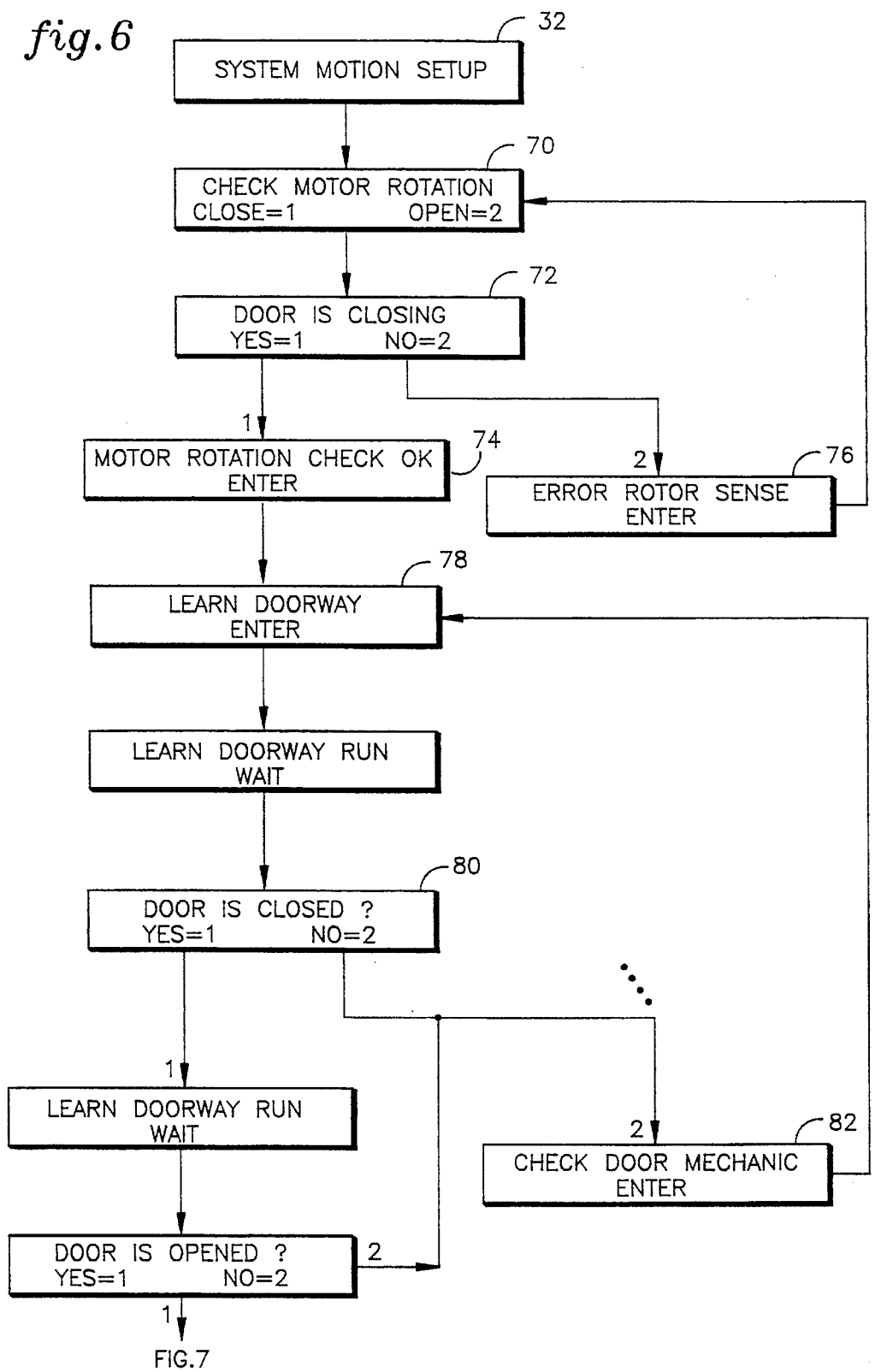
FIGS. 6 and 7 which are flow diagrams of a system motion setup adjustment task.

The next elevator door adjustment task to be selected in the system motion setup task at block 32. As shown in FIG. 6 the service person is prompted to perform the learning runs required for the elevator door system to learn the elevator door profile. As shown at block 70, the service person is prompted to check the rotation of the motor shaft and hence, provide the system controller 20 with the information necessary to recognize and control the direction of movement of the elevator door. In response to the first learning run, the service person enters, at block 72, the direction of the door movement. In the example shown, if the door is closing, the program moves to the motor rotation check, at block 74, whereat the service person indicates that the door is moving in the proper direction. If, however, in this example, the elevator door is opening, the service person receives the message, at block 76, indicating that an error in the direction of movement has been sensed and the program returns to the block 70 to check the direction of movement of the elevator door by a second run.

Thereafter, once the direction of the elevator door movement is determined to be correct, the program prompts, at block 78, the service person to initiate a second learning run. The service person is then held, i.e., the service tool 27 is essentially disabled from communication with the system controller 20 while the system controller 20, as described in the above referenced patent application, moves the door to one of the mechanical stops, i.e., either fully open or fully closed. Thereafter, the service person is prompted to indicate, at block 80, whether or not the elevator door is closed. In this example, if the door is closed, the service person is then held while the system controller 20 performs the second learning run in the opposite direction whereat the number of pulses from the encoder are counted by the system controller 20. As fully described in the above referenced patent application, the system controller 20, from this information, can now accurately recognize the door movement direction and position at any time by counting the number of pulses generated by the encoder 16 when the door is in motion. If, however, in this example, the door is open the service person, at block 82, is returned to the learn doorway run initiation, at block 78.

Figure 7:
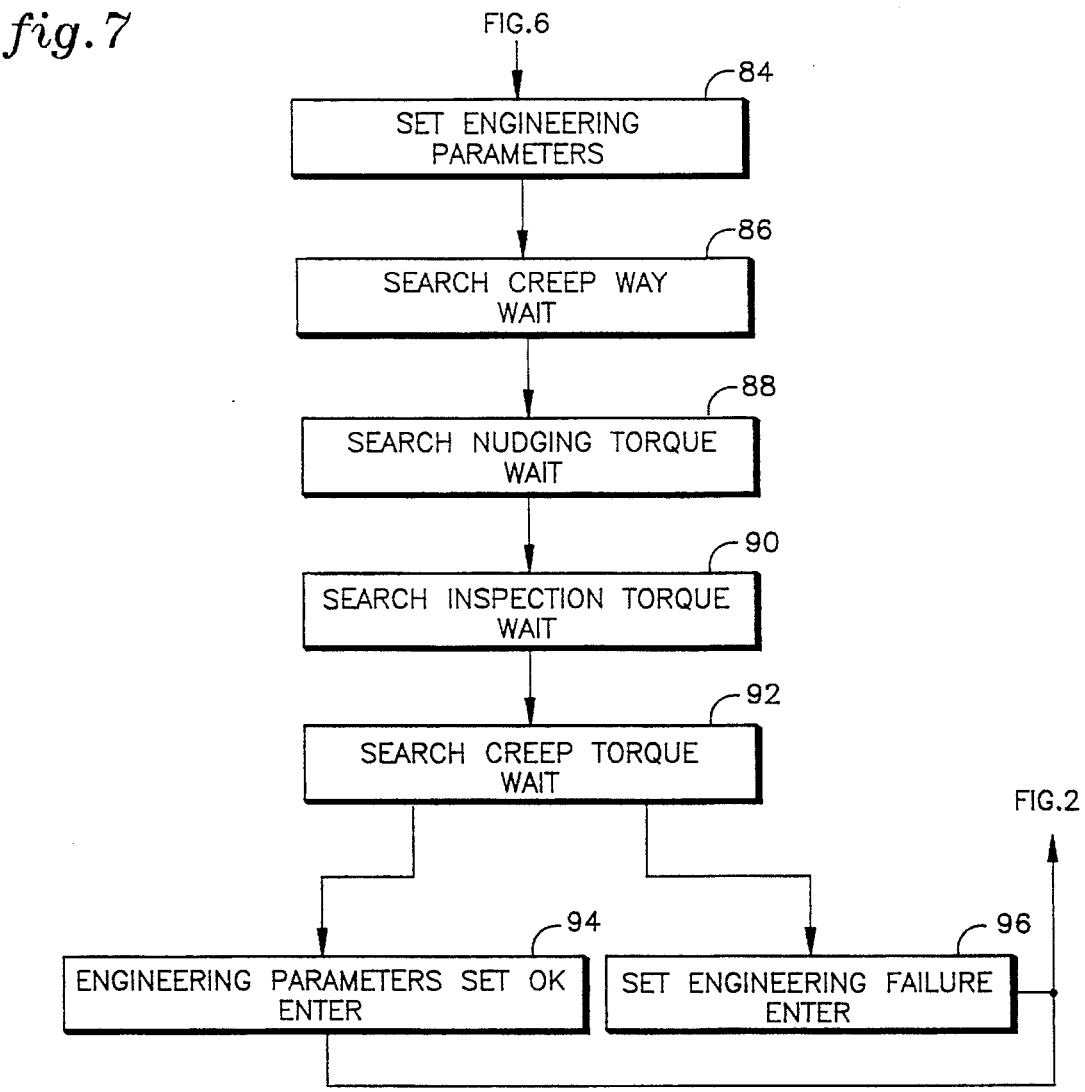
Figure 11:
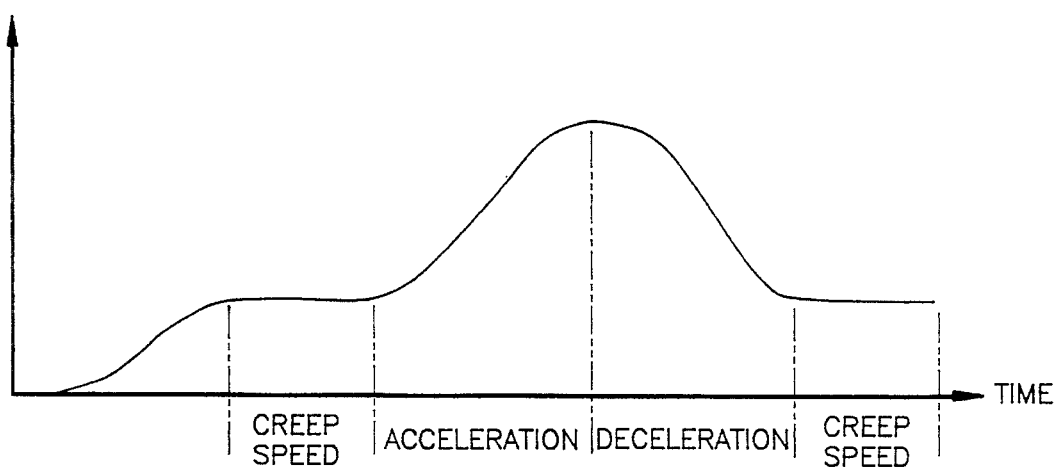
FIG. 11 which is a representative door closing profile that shows door velocity versus time.

Subsequent to learning the doorway information, the service person is prompted, at block 84, as shown in FIG. 7, to set the engineering parameters for the elevator door movement. Such parameters will include, for example, the torques used in the inspection profile (INSP TORQ), the nudging profile (NDG TORQ), the normal closing profiles a short distance before fully closed (CRP OUT TORQ) and the creep ways of the normal opening and closing profiles (CRP IN WAY<CRP OUT WAY). Thereafter, the service person is held while the program first determines, at block 86, the creep in and the creep out ways by moving the elevator door. The program then determines the nudging torque, at block 88, which is the lower speed that will guarantee the proper static torque. The inspection torque is then determined, at block 90. The program then searches for the proper creep torque, at block 92, to ensure proper operation of the elevator door during closing. During the last few centimeters of door closing travel, typically about 5 centimeters, the reversal devices are inactive. Therefore the torque, and thus the static force which can occur, has to be limited. The various parameters selected are determined from the door closing profile selected. A typical door closing profile of door velocity versus time is shown in FIG. 11. The profile generator 25 will produce a velocity versus distance profile in accordance with the parameters selected during this subroutine.

When the profile is determined, the service person, at block 94, is requested to indicate whether or not the setup of the engineering parameters is acceptable. This provides information to the service person to indicate that the microprocessor 23 was able to investigate all of the engineering parameters. If, however, the information provided does not result in an acceptable or recognizable profile, the service person, at block 96, is advised of the engineering setup failure and is returned to the main elevator adjustment task list.

Figure 8:
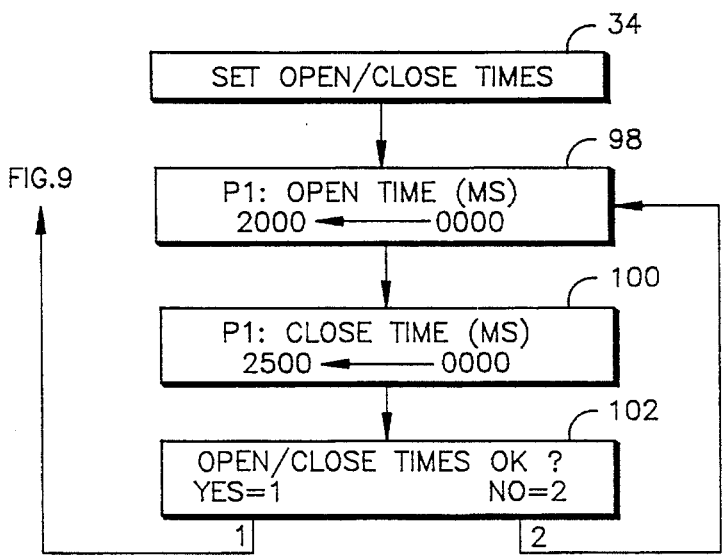
FIG. 8 which is a flow chart for adjusting the opening and closing times of the elevator door.

When the engineering parameters are set, the service person selects the door opening and door closing adjustment task at block 34 of the main elevator door adjustment task list. As shown in FIG. 8, the service person is then prompted to select one of a number of door opening times provided by the system controller 20 and a door closing time at blocks 98 and 100, respectively. Thereafter, the service person is prompted to confirm the choice, at block 102. Once the choice is confirmed the service person is directed to the show motion setup subtask at block 38, shown in FIG. 9. If not confirmed, the service person is returned to the selection blocks, 98 and 100. The selection of the door opening time can be used to control the operation of the door during different usage times. For example, typically as elevator door will be set to open more quickly during heavy usage times, i.e., during the day, and will be set to open more slowly during lesser usage times, such as at night.

Figure 9:
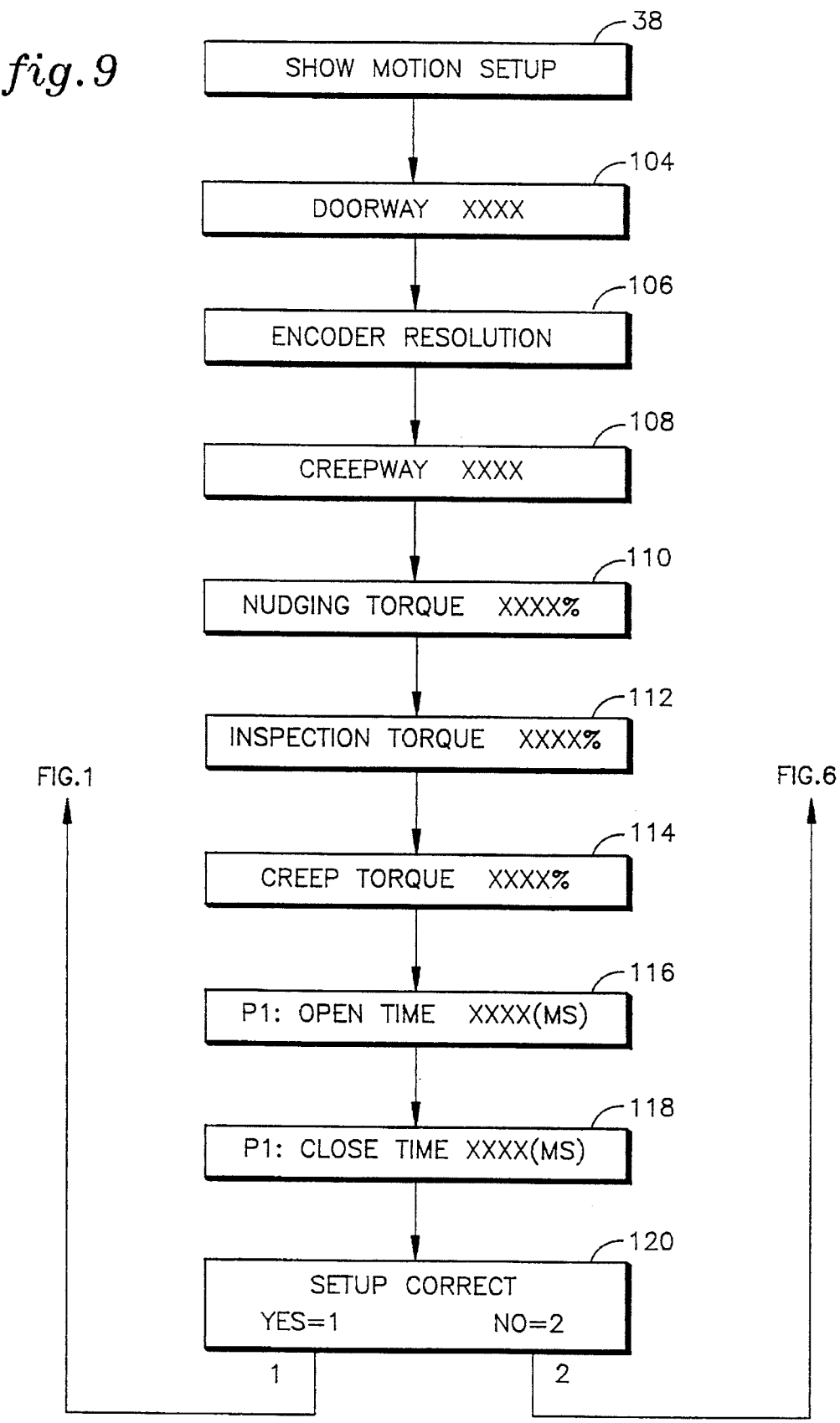
FIG. 9 which is a flow diagram of a subroutine particularly useful in conjunction with the present method.
Figure 10:
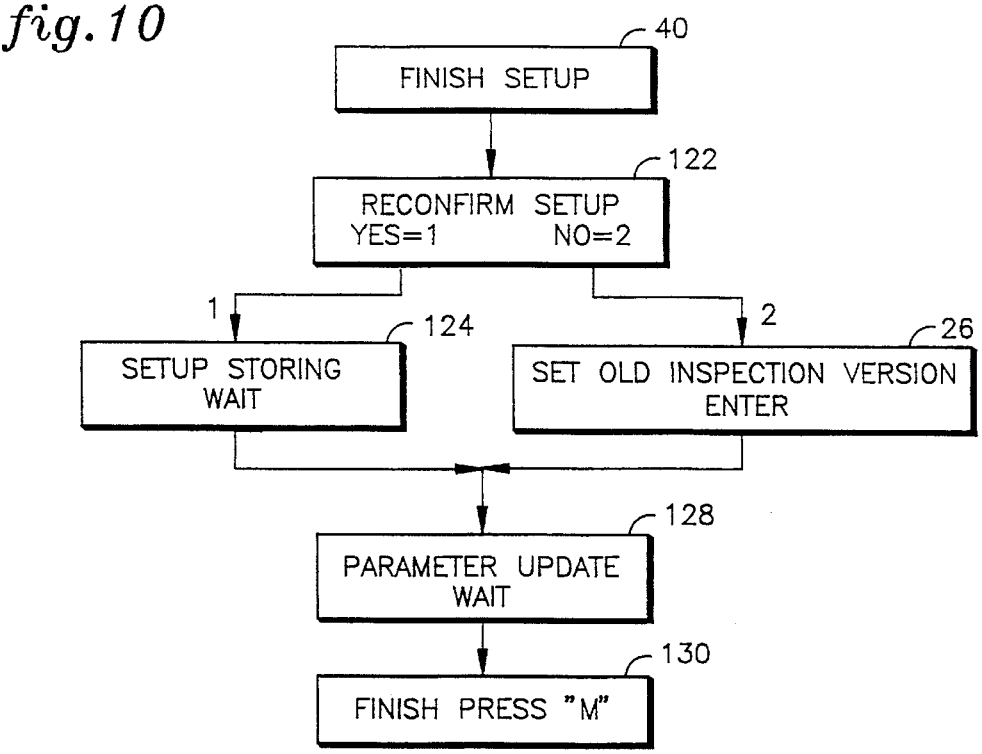
FIG. 10 which is a flow diagram of another subroutine particularly useful in conjunction with the present method.

As shown in FIG. 9, the service person is then prompted to confirm the setup by reviewing the parameters that have been entered. In this embodiment, the parameters confirmed are the door way information (block 104), i.e., the number of increments per full door closing as determined in accordance with the engineering parameter setup, the encoder resolution (block 106), the creep way (block 108) in percentage of total closing distance, the nudging torque (block 110) in percentage of total torque, the inspection torque (block 112) in percentage of total torque, the creep torque (block 114) in percentage of total torque, the closing time (block 114) in milliseconds. The service person scrolls through these system parameters, for example, by use of the enter key on the service tool 27. Upon completion of the scrolling, the service person is prompted, at block 120, to indicated the correctness of the parameters. If all are correct, the program returns to the main elevator door adjustment task list. However, if any parameter is incorrect, the program automatically returns to the system motion setup block 32 so that the setup routine can be rerun.

Once confirmed, the service person selects the finish setup task at block 40. Thereat the service person is prompted to reconfirm the setup at block 122. If reconfirmed the system controller 20 stored the setup at block 124. If not reconfirmed the old system status will be recovered at block 126. Thereafter, the parameters are updated in the EEPROM 24 at block 128 and the program is completed at block 130.

As will be understood from the above discussion, by use of the present method an elevator door can be programmed to operate in an efficient and safe manner. By use of the present method, the system controller 20 is provided with the proper information to control the signals provided to the door motor to control the phase, the voltage, and the frequency thereof. By such a control, the system controller 20 controls the opening and closing of the elevator door at every point along the profile thereof.

Although the present invention has been discussed and described with respect to one or more specific embodiments it will be understood that other arrangements and configuration can also be implemented that do not depart from the spirit and scope hereof. Hence, the present invention is deemed limited only by the appended claims and the reasonable interpretation thereof.

What is claimed is:

1. A method for adjusting an elevator door, comprising the steps of:

providing a service task prompt having a service task list of elevator door adjustment service tasks performed by an elevator door adjustment service program in an elevator door controller;

selecting an elevator door adjustment service task from the service task list;

inputting an elevator door adjustment parameter corresponding to said elevator door adjustment service task;

storing said elevator door adjustment parameter in a memory of said elevator door controller; and controlling said elevator door in accordance with said elevator door adjustment parameter by adapting the phase, voltage, and torque of an elevator door motor with said elevator door controller.

2. The method as claimed in claim 1, wherein said service task list includes a default parameter setup service task that comprises the steps of:

requesting a default setup task;

inputting a plurality of default parameters, said default parameters being specific to said elevator door; and updating said default parameters in said memory of said elevator door controller.

3. The method as claimed in claim 1, wherein said service task list includes a door configuration parameters setup service task that comprises the steps of:

inputting elevator door motor type information;

inputting elevator encoder type information;

inputting interface information;

inputting interface address information whereby a microprocessor of said elevator door controller can access an interface; and confirming door configuration parameters of said door configuration parameters setup service task.

4. The method as claimed in claim 1, wherein said service task list includes a door motion setup service task that comprises the steps of:

determining a direction of door motion and inputting elevator door motion direction information into said elevator door controller; and determining a velocity and position of said elevator door and inputting elevator door velocity and position information into said elevator door controller.

5. The method as claimed in claim 1, wherein said service task list includes an engineering parameters setup service task that comprises the steps of:

setting a creep way of said elevator door;

setting a nudging torque of said elevator door;

setting an inspection torque of said elevator door;

setting a creep torque of said elevator door; and confirming engineering parameters of said engineering parameters setup service task.

6. The method as claimed in claim 1, wherein said service task list includes an elevator door opening and closing times setup service task that comprises the steps of:

setting, in response to a desired opening time prompt from said elevator door controller, a desired opening time for said elevator door;

setting, in response to a desired closing time prompt from said elevator door controller, a desired closing time for said elevator door; and confirming desired opening and closing times for said elevator door.

7. The method as claimed in claim 1, wherein said service task list includes an elevator door motion setup service task that comprises the steps of:

scrolling through each motion parameter such that the accuracy thereof can be verified; and accepting or rejecting inaccurate motion parameters.

8. The method as claimed in claim 1, wherein said service task list includes a task of completing the elevator door adjustment service task that comprises the steps of:

electing either to confirm or reject said elevator door adjustment service task; and either storing said elevator door adjustment parameter in an electronically erasable programmable read-only-memory if said step of electing is to confirm said elevator door adjustment service task, or setting said elevator door controller to previous programmed parameters if said step of electing is to reject said elevator door adjustment service task.

9. The method as claimed in claim 1, wherein said elevator door adjustment task service list includes tasks of setting default parameters, setting up a door configuration, setting up a door motion, setting engineering parameters, and setting opening and closing times of said elevator doors.

10. The method as claimed in claim 9, wherein said elevator adjustment task service list further comprising the step of:

showing a motion setup for said elevator doors; and completing the motion setup of said elevator doors.

11. The method as claimed in 10, wherein a service task of setting default parameters includes the steps of:

requesting a default setup task;

inputting a plurality of default parameters, said default parameters being specific to said elevator door; and updating said plurality of default parameters in the memory of said elevator door controller.

12. The method as claimed in claim 11, wherein a service task of setting up the door configuration includes the steps of:

inputting elevator door motor type information;

inputting elevator encoder type information;

inputting interface information;

inputting address information whereby said microprocessor can access said interface; and confirming door configuration information.

13. The method as claimed in claim 12, wherein a service task of setting up the door motion includes the steps of:

determining a direction of elevator door motion and inputting said elevator door direction information into said elevator door controller; and determining a velocity and position of said elevator door and inputting elevator door velocity and position information into said elevator door controller.

14. The method as claimed in claim 13, wherein a service task of setting engineering parameters includes the steps of:

setting a creep way of said elevator door;

setting a nudging torque of said elevator door;

setting an inspection torque of said elevator door;

setting a creep torque of said elevator door; and confirming said engineering parameters.

15. The method as claimed in claim 14, wherein a service task of setting the opening and closing times of said elevator doors includes the steps of:

setting, in response to a desired opening time prompt from said system controller, a desired opening time for said elevator door;

setting, in response to a desired closing time prompt from said system controller, a desired closing time for said elevator door; and confirming settings for desired opening and closing times.

16. The method as claimed in claim 1, wherein the steps are repeated for another service task prompt having another service task list of other elevator door adjustment service tasks performed by the elevator door adjustment service program in the elevator door controller.

* * * * *